Nov. 28, 1961   M. G. KONING   3,010,326
BALANCING APPARATUS
Filed Dec. 22, 1959
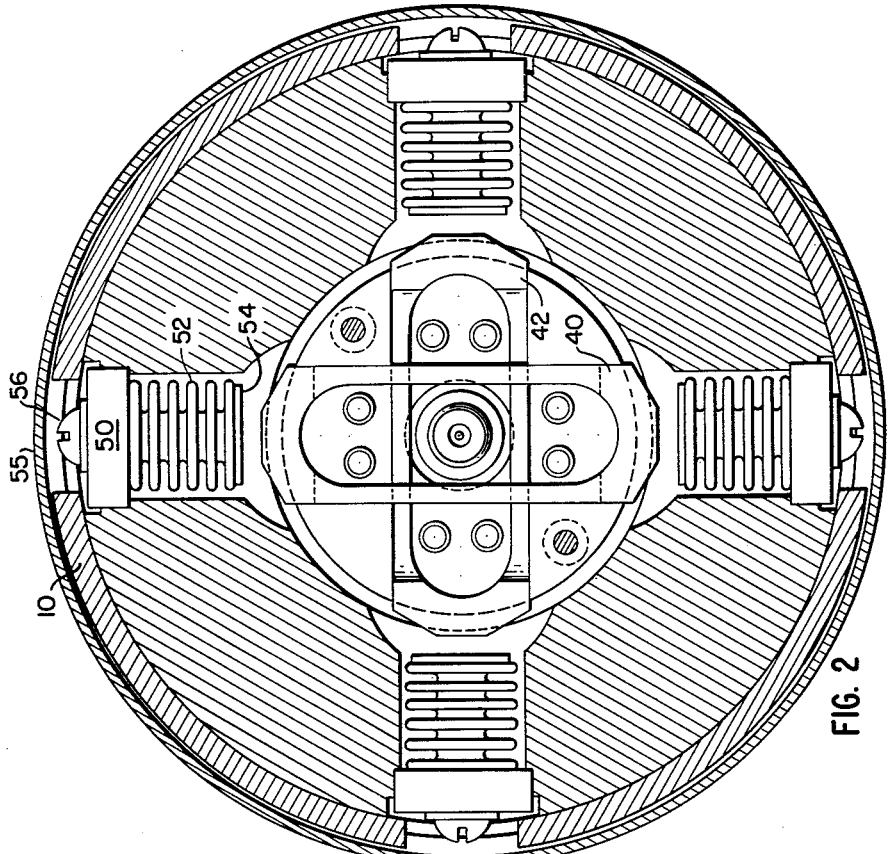
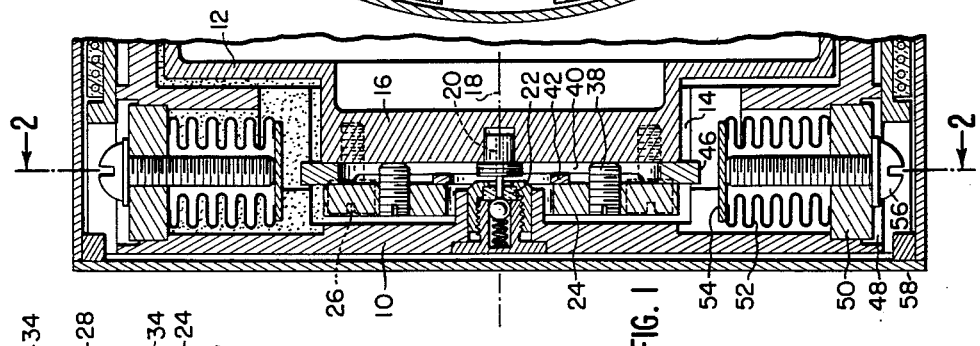
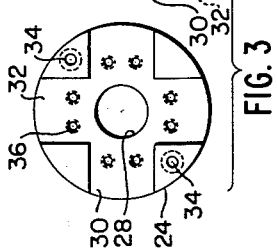
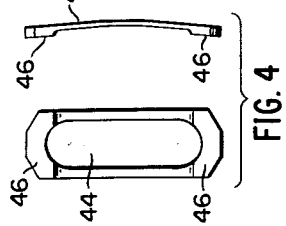
*INVENTOR.*
MENNO G. KONING
BY
KENWAY, JENNEY, WITTER & HILDRETH
ATTORNEYS

United States Patent Office 3,010,326
Patented Nov. 28, 1961

3,010,326
BALANCING APPARATUS
Menno G. Koning, Dover, Mass., assignor, by mesne assignments, to Northrop Corporation, Beverly Hills, Calif., a corporation of California
Filed Dec. 22, 1959, Ser. No. 861,355
10 Claims. (Cl. 74—5.4)

The present invention relates in general to new and improved apparatus for balancing a gyro and in particular to apparatus for balancing a gyro gimbal from the outside of a sealed housing in which the gyro is disposed.

In a gyroscope which is destined for a gyro-controlled system, it is important that the gyro gimbal (or gimbals) be perfectly balanced about the gimbal rotation axis in order to prevent gyro drift which may affect the accuracy of the entire system. This is particularly the case when the gyro is used in a navigation system or the like, where such an error may have a cumulative effect. It is extremely difficult to machine the gyro components to obtain perfect gimbal balance due to human limitations as well as due to the limitations of the machine tools used in the manufacture of the gyro components. Accordingly, gimbal balancing means are frequently provided in conjunction with each gyro in order to remedy this defect. In general, these balancing means attempt to position a mass which is adapted to rotate with the gimbal in order to shift the gimbal center of gravity.

Presently available gyros which are so equipped enjoy only limited success since they require direct access to the balancing means and to the gimbal. Under these conditions, a proper gimbal balance is obtained prior to the time when the gyro is enclosed in its housing. If, as is frequently the case, the gyro is positioned in an hermetically sealed housing filled with a viscous fluid, ready access to the balancing means is no longer possible. Any subsequently occurring unbalance, e.g. gimbal unbalance due to the repeated solidification and liquefaction of the viscous fluid with ambient temperature changes and its effect on the delicate gimbal suspension, cannot be corrected other than by breaking the hermetic seal and draining the fluid.

Prior attempts at overcoming this difficulty have resulted in elaborate constructions which have materially increased the difficulty as well as the expense of gyroscope manufacture. The overriding disadvantage, however, of such apparatus has been the addition of considerable bulk and weight to an instrument which must generally be kept as small and light as possible. A typical construction which is representative of the prior art, is disclosed in Patent No. 2,707,882, and employs a "Hermeflex" unit for transmitting rotary motion through a sealed wall. This arrangement requires not only a fairly complicated construction, but also adds a substantial amount of weight and bulk to the gyro which seriously detracts from its overall utility.

Accordingly, it is the primary object of the present invention to provide improved apparatus for balancing a gyro gimbal from the outside of a sealed housing in which the gyro is disposed.

It is another object of this invention to provide apparatus for externally balancing the gimbal of a sealed gyro, which is simple in construction which adds only a minimal amount of weight and bulk to the gyro.

In accordance with the invention which forms the subject matter of this application, the foregoing objects are carried out by providing at least one balancing mass which is resiliently urged against the gyro gimbal in an axial direction. Hermetically sealed access means in the form of bellows are spaced about the gyro casing and permit the manipulation of the balancing mass without breaking the hermetic seal. Positioning of the balancing mass relative to the gimbal rotation axis in a plane normal to the latter may thus be carried out against the action of the continuously applied, axial resilient holding force.

These and other objects of this invention together with further features and advantages thereof will become apparent from the following detailed specification when read in conjunction with the accompanying drawings in which:

FIG. 1 is an elevation view of the pertinent portion of a gyro which embodies the present invention;

FIG. 2 is a view taken along line 2—2 of FIG. 1;

FIG. 3 illustrates a preferred embodiment of a clamping plate; and

FIG. 4 illustrates a balancing bar for use with the clamping plate of FIG. 3.

With reference now to the drawings, an hermetically sealed housing 10 is seen to contain a gimbal 12 in the form of a shell which is completely surrounded by a viscous fluid 14. The base 16 of the gimbal shell, which is substantially normal to the gimbal rotation axis 18, includes a construction adapted to hold a pivot 20 in alignment with the gimbal rotation axis. The pivot 20 rides in a jewel pivot bearing 22 which is ultimately supported by the housing 10.

A clamping plate 24 is affixed by means of screws 26 to the base 16 of the gimbal shell 12. The clamping plate 24 is illustrated in greater detail in FIG. 3 and is seen to consist of an annular ring having a central opening 28 to accommodate the pivot bearing structure, as well as a pair of perpendicularly intersecting grooves 30 and 32. The holes 34 accommodate the screws 26 (see FIG. 1) for affixing the clamping plate to the gimbal shell, while the holes 36 selectively accommodate set screws 38 whose mass is used to provide a rough gimbal balance.

The perpendicularly intersecting grooves 30 and 32 of the clamping plate 24 permits sliding motion of a pair of balancing bars 40 and 42 which are disposed between the clamping plate and the gimbal base 16. The balancing bars are illustrated in greater detail in FIG. 4 and are seen to contain an elongated central slot 44 which clears the pivot bearing structure. Each balancing bar further comprises a central portion 45 which terminates in a pair of raised end portions 46. The latter are seen to extend beyond the perimeter of the clamping plate 24 and of the gimbal base 16 when the balancing bars are in clamped position (see FIG. 1). The central portion 45 of each balancing bar is slightly curved so that the balancing bar curves out of the plane of the clamping plate in its unclamped condition. In order to permit a sliding motion of the balancing bars in their corresponding grooves without interfering with each other, the raised end portions 46 are so arranged in the grooves that the respective central portions 45 are disposed in different planes. In this position the balancing bars are resiliently clamped against the gimbal base 16 by the action of the clamping plate 24.

The housing 10 further contains an access opening 48 corresponding to each one of the protruding balancing bar portions 46 and aligned therewith. A hub plate 50 is positioned in each access opening, an extensible bellows 52 being sealed thereto and extending interiorly of the housing 10. The bellows 52 terminates in a rigid end plate 54 which is sealed thereto. The hub plate 50 further includes a tapped hole which accommodates a mating screw 56 that extends into the bellows a sufficient distance to contact the end plate 54.

If it is desired to adjust the gyro gimbal balance, all but one of the screws 56 are partially withdrawn in order to permit free motion of their corresponding end plates. The remaining screw is further inserted until its contacting end plate applies a force against the balancing bar end portion 46 which is aligned with it. Simultaneously, the extension of the bellows surrounding the inserted screw causes a displacement of the viscous fluid which tends to compress the bellows in the other portions of the housing. Any further forward motion of the inserted screw causes its corresponding end plate to bring force to bear against the protruding end portion 46. This force is sufficient to displace the balancing bar relative to the gimbal axis, against the holding action of the axially applied resilient force clamping it to the gimbal. It will be noted that, since the balancing bars are constrained to move in their corresponding grooves, they may only be positioned in a plane normal to the gimbal rotation axis. Proper gimbal balancing may thus be obtained by positioning the two balancing bars in their corresponding grooves and thereby shifting the effective center of gravity of the gimbal. It will be understood that the positioning screw 56 must be partially withdrawn in each case if a displacement of the same balancing bar in the opposite direction is to be carried out.

When proper balance has been obtained, the screws 56 are withdrawn to an extent where the end plates are out of contact with their corresponding balancing bars. Each screw is locked in place by suitable locking means in a position where the corersponding bellows 56 is partially extended and the end plate 54 is held rigidly in place. Where balancing screws have been used, the screw heads will extend a substantial distance outside of the sealed housing 10 in this position. If the hermetically sealed housing includes an additional protective cover 58 which cannot accommodate the extending screws 56, the latter are replaced by shorter screws which do not extend materially beyond the housing 10 but which still maintain the bellows in an extended position by applying force against the end plate 54.

It will be understood that the invention herein is not confined to the illustrated embodiment. For example, it is not necessary to use a screw in order to manipulate the balancing bars. Any elongated rod-like structure which fits through the threaded hole in the hub plate 50 may be employed in order to cause the end plate 54 to apply force to its corresponding balancing bar. It is only necessary that sufficient force be applied in order to displace the balancing bar against the action of the axially applied resilient clamping force which must be sufficiently high to hold the balancing bar in place during any maneuver to which the gyro may be subjected.

The illustrated embodiment of the invention shows balancing apparatus which is capable of independently adjusting the balance of a gyro in two mutually perpendicular planes. By the use of additional balancing bars this construction may be modified to provide an independent adjustment in more than two planes. It is also possible to use a single balancing mass, e.g. in the form of an annular disk, in place of the separate balancing bars, suitable points being provided on the disk for the application of force through the bellows. Such a disk requires a central opening sufficiently large to accommodate the pivot bearing structure while still permitting movement in a plane normal to the gimbal rotation axis. In such a case the resilient clamping force is preferably due to the spring-like construction of the clamping plate itself. If desired, such an arrangement may be further modified to provide the clamping plate and the balancing disk with a mating construction to permit only rectilinear displacement of the disk.

From the foregoing disclosure of the invention it will be apparent that numerous modifications, departures and equivalents will now occur to those skilled in the art, all of which fall within the true spirit and scope of this invention.

I claim:
1. Apparatus for adjusting the balance of a gyro gimbal about the gimbal rotation axis externally of a sealed housing in which the gyro is disposed comprising, clamping means, balancing means positioned between said gimbal and said clamping means, said clamping means cooperating with said balancing means to clamp the latter resiliently against said gimbal, sealed, flexible access means disposed in said housing, said access means permitting the application of force to said balancing means to displace the latter relative to said gimbal.

2. In a gyro disposed in an hermetically sealed, fluid-filled housing, means for externally adjusting the balance of the gyro gimbal about the gimbal rotation axis comprising, a clamping plate affixed to said gimbal substantially normal to said gimbal rotation axis, a pair of resilient blancing bars slideably positioned between said clamping plate and said gimbal and resiliently urged against the latter, said balancing bars being disposed at right angles to each other and extending beyond said clamping plate and said gimbal, a plurality of openings in said housing aligned with said balancing bars, a bellows radially extending into said housing from each of said openings and providing an hermetic seal, and means for applying force through said bellows to said balancing bars to position the latter in a direction normal to said gimbal rotation axis.

3. Apparatus for adjusting the balance of a gyro gimbal about the gimbal rotation axis externally of a sealed housing in which the gyro is disposed comprising, a clamping plate affixed to said gimbal in a plane substantially normal to said gimbal rotation axis, balancing means adapted to be resiliently clamped against said gimbal by said clamping plate, a plurality of openings in said housing each including a flexible, sealed bellows extending into said housing, and means for positioning said balancing means relative to said gimbal by manipulation through said bellows.

4. In a gyro positioned in a sealed housing and including a gimbal rotatably disposed about a gimbal rotation axis, means for resiliently holding at least one balancing weight in contact with said gimbal, sealed access means disposed in said housing, said access means being adapted to permit external positioning of said balancing weight in a plane normal to said gimbal rotation axis.

5. In combination with a gyro positioned in a sealed housing and including a gimbal rotatably disposed about a gimbal rotation axis, means for resiliently holding a plurality of balancing weights in contact with said gimbal, sealed expansible means spaced about said housing to provide access to the interior thereof, said sealed expansible means being adapted to permit the positioning of said balancing weights in a plane normal to said gimbal rotation axis.

6. Apparatus for adjusting the balance of a gyro gimbal about the gimbal rotation axis externally of a sealed housing in which the gyro is disposed comprising, a clamping plate affixed to said gimbal in a plane substantially normal to said gimbal rotation axis, a plurality of balancing means adapted to be resiliently clamped against said gimbal by said clamping plate, a plurality of openings in said housing each including a flexible, sealed bellows extending into said housing, and means for independently positioning said balancing means relative to said gimbal by manipulation through said bellows.

7. In a gyro positioned in a sealed housing and including a gimbal rotatably disposed about a gimbal rotation axis, means for resiliently holding a plurality of balancing weights in contact with said gimbal, sealed access means disposed in said housing, said access means being adapted to permit independent external positioning of said balancing weights in a plane normal to said gimbal rotation axis.

8. In combination with a gyro positioned in a sealed housing and including a gimbal rotatably disposed about a gimbal rotation axis, means for resiliently holding a plurality of independent balancing weights in contact with said gimbal, sealed expansible means spaced about said housing to provide access to the interior thereof, said sealed expansible means being adapted to permit the independent positioning of said balancing weights in a plane normal to said gimbal rotation axis.

9. In a gyro disposed in an hermetically sealed, fluid-filled housing, said gyro including a gimbal rotatably supported in a pivot bearing aligned with the gimbal rotation axis, means for adjusting the balance of said gimbal about said gimbal rotation axis comprising, a clamping plate affixed to said gimbal substantially normal to said gimbal rotation axis, said clamping plate including a plurality of grooves facing said gimbal, a resilient balancing bar slideably disposed in each of said grooves and adapted to curve out of the plane of said clamping plate, said clamping plate resiliently urging said balancing bars against said gimbal, said balancing bars being centrally slotted to clear said pivot bearing and extending beyond the perimeter of said clamping plate and said gimbal, a plurality of openings circumferentially spaced about said housing and aligned with said balancing bars, a sealed bellows extending into said housing from each of said openings, and means for applying force to said balancing bars through said bellows to displace said balancing bar relative to said gimbal rotation axis.

10. In a gyro disposed in an hermetically sealed, fluid-filled housing and having a gimbal rotatably supported in a gimbal bearing aligned with the gimbal rotation axis, said gimbal including a gimbal shell, means for externally adjusting the balance of said gimbal about said gimbal rotation axis comprising, an annular clamping plate affixed to said gimbal shell substantially concentric with said gimbal rotation axis and in a plane normal thereto, said clamping plate including a pair of perpendicularly intersecting grooves facing said gimbal shell, a pair of resilient balancing bars disposed in said grooves so as to maintain sliding clearance from each other, said balancing bars curving out of the plane of said clamping plate and adapted to be resiliently clamped against said gimbal shell by said clamping plate, each of said balancing bars having a central slot adapted to clear said pivot bearing and further including a pair of end portions partially protruding beyond the perimeter of said clamping plate and said gimbal shell, said housing having an opening positioned opposite each of said protruding end portions, a hub plate disposed in each of said openings including a tapped hole, an expansible bellows sealed to said hub plate and extending interiorly of said housing, said bellows terminating in a rigid end plate sealed thereto, a threaded shaft mating with said tapped hole and extending into said bellows to contact said end plate, said shaft being adapted to urge said end plate against its oppositely positioned protruding end portion in order to displace the corresponding balancing bar.

References Cited in the file of this patent

UNITED STATES PATENTS

| | | |
|---|---|---|
| 1,308,692 | Beattie | July 1, 1919 |
| 2,650,502 | Lundberg et al. | Sept. 1, 1953 |
| 2,707,882 | Kent | May 10, 1955 |
| 2,780,940 | Brown | Feb. 12, 1957 |
| 2,855,782 | Grohe | Oct. 14, 1958 |